United States Patent
Mitra

(10) Patent No.: US 7,504,984 B1
(45) Date of Patent: Mar. 17, 2009

(54) LARGE SCALE IMAGING WITH SPATIALLY-CODED WAVEFORMS

(75) Inventor: Atindra K. Mitra, Beavercreek, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 11/803,813

(22) Filed: May 15, 2007

Related U.S. Application Data

(60) Provisional application No. 60/909,114, filed on Mar. 30, 2007.

(51) Int. Cl.
*G01S 13/00* (2006.01)
*G01S 13/08* (2006.01)

(52) U.S. Cl. .............................. 342/22; 342/59; 342/132
(58) Field of Classification Search .................. 342/22, 342/26 R, 26 A, 26 F, 59, 125, 132
See application file for complete search history.

(56) References Cited

U.S. PATENT DOCUMENTS

| | | | | |
|---|---|---|---|---|
| 4,309,703 | A * | 1/1982 | Blahut | 342/201 |
| 5,673,050 | A * | 9/1997 | Moussally et al. | 342/22 |
| 5,745,069 | A * | 4/1998 | Gail | 342/25 F |
| 5,774,091 | A * | 6/1998 | McEwan | 342/387 |
| 5,835,054 | A * | 11/1998 | Warhus et al. | 342/22 |
| 5,898,399 | A * | 4/1999 | Carrara et al. | 342/25 A |
| 5,912,639 | A * | 6/1999 | Beckner | 342/22 |
| 6,400,754 | B2 * | 6/2002 | Fleming et al. | 375/140 |
| 6,437,727 | B2 | 8/2002 | Lemelson et al. | |
| 6,483,777 | B1 | 11/2002 | Zeroug | |
| 6,982,666 | B2 * | 1/2003 | Temes et al. | 342/22 |
| 6,544,182 | B2 | 4/2003 | Averkiou | |
| 6,590,519 | B2 * | 7/2003 | Miceli et al. | 342/22 |
| 6,614,813 | B1 * | 9/2003 | Dudley et al. | 370/532 |
| 6,653,970 | B1 * | 11/2003 | Mitra | 342/22 |
| 6,657,577 | B1 * | 12/2003 | Gregersen et al. | 342/22 |
| 6,664,914 | B2 * | 12/2003 | Longstaff et al. | 342/22 |
| 6,727,841 | B1 * | 4/2004 | Mitra | 342/25 R |
| 6,750,809 | B1 * | 6/2004 | Cho et al. | 342/129 |
| 6,866,633 | B2 | 3/2005 | Trucco | |

(Continued)

OTHER PUBLICATIONS

Deep ground penetrating radar (GPR) WIPD-D models of buried sub-surface radiators Norgard, J.D.; Wicks, M.C.; Musselman, R.L.; Wireless Communications and Applied Computational Electromagnetics, 2005. IEEE/ACES International Conference on Apr. 3-7, 2005 pp. 114-119.*

(Continued)

*Primary Examiner*—Thomas H Tarcza
*Assistant Examiner*—Peter M Bythrow
(74) *Attorney, Agent, or Firm*—AFMCLO/JAZ; Jeffrey R. Moore

(57) ABSTRACT

A system for locating earth cavities, or items in a building, or structural characteristics having a plurality of transmitters that generate at least a portion of a waveform. Each transmitter divides the waveform into sub-chirp intervals and transmits a known sub-chirp interval from a known location to contact an article of interest. The resulting sub-chirp intervals become a leakage signal that is then received and processed by a receiver. The receiver therein approximates a cavity size, article size, article composition, article location, earth cavity location, or other structural characteristic.

12 Claims, 3 Drawing Sheets

U.S. PATENT DOCUMENTS

| | | | |
|---|---|---|---|
| 6,867,727 B1 * | 3/2005 | Mitra | 342/59 |
| 6,919,839 B1 * | 7/2005 | Beadle et al. | 342/25 R |
| 6,989,782 B2 * | 1/2006 | Walker et al. | 342/134 |
| 7,068,210 B1 * | 6/2006 | Mitra et al. | 342/63 |
| 7,262,602 B2 * | 8/2007 | Meyer | 324/337 |

OTHER PUBLICATIONS

A multi antenna ultra wideband ground penetrating radar system using arbitrary waveforms Eide, E.S.; Hjelmstad, J.F.; Geoscience and Remote Sensing Symposium, 1999. IGARSS '99 Proceedings. IEEE 1999 International vol. 3, Jun. 28-Jul. 2, 1999 pp. 1746-1748 vol. 3.*

Modular design of SAR electronics Petz, F.A.; Rosello-Guasch, J.; Mavrocordatos, C.; Narasimha Rao, C. V.; Microwave Theory and Techniques, IEEE Transactions on vol. 47, Issue 12, Dec. 1999 pp. 2220-2227.*

Leakage Signal Analysis for Position-Adaptive UAV Radar Applications Radar sensor technology IX: (Mar. 31, 2005, Orlando, Florida, USA) Radar sensor technology. Conference No. 9, Orlando FL, ETATS-UNIS (Mar. 31, 2005), vol. 5788, pp. 65-73, [Note(s): VII-228 p.,] [Document: 9 p.] (4 ref.)).*

A.K. Mitra et al., "Low-Cost Position-Adaptive UAV Radar Design with State-of-the-Art COTS Technology".

A.K. Mitra, "Leakage Signal Analysis for Position-Adaptive UAV Radar Applications".

* cited by examiner

LARGE SCALE IMAGING WITH SPATIALLY-CODED WAVEFORMS

This application claims priority to U.S. provisional application 60/909,114 filed Mar. 30, 2007, which is hereby incorporated by reference in its entirety.

RIGHTS OF THE GOVERNMENT

The invention described herein may be manufactured and used by or for the Government of the United States for all governmental purposes without the payment of any royalty.

BACKGROUND OF THE INVENTION

Adversaries have developed sophisticated tools for hiding underground and in spaces below ground level and in buildings. They have further developed techniques that help them hide from density searches and infrared.

Previous work in this area position-adaptive radar includes Atindra K. Mitra and Krishna M. Pasala, "Low-Cost position-Adaptive Unmanned Aviation Vehicle (UAV) Radar Design with State-of-the-Art COTS Technology," Radar Sensor Technology X, DSS 2004 and Atindra K. Mitra, "Leakage Signal Analysis for Position-Adaptive UAV Radar Applications," Radar Sensor Technology XI, DSS 2005, both incorporated herein by reference. These articles have addressed topics such as short-range monostatic position-adaptive radar design for mini-unmanned aviation vehicle helicopter platforms as well as electromagnetic phenomenology and associated signal processing for position-adaptive radar. Some of these position-adaptive radar designs are based on state-of-the-art ultra-wideband impulse radar technology.

The present invention uses a plurality of platforms to transmit waveform signals with different sub-chirp intervals. At least a plurality of the sub-chirp intervals is received by a receiver or receiver means. The means for receiving the sub-chirp intervals may be any means known in the art such as digital receivers. The receiver is designed to receive the sub-chirp signals and process the sub-chirp signals over the entire chirp interval that is covered by all the transmitted sub-chirps. Alternatively, the receiving means may processes a plurality of the sub-chirp signals over a plurality of the chirp interval that is covered by a plurality of the transmitted sub-chirps.

Chirp and sub-chirp technology is different from ultrasonic imaging because spatially coded waveforms of radio and microwaves with sub-chirp technology provide a new capability for detecting directional multipath as opposed to traditional Radio Frequency (RF) and microwave imaging systems that rely on line-of-sight propagation. The present invention is non-acoustical and employs the data from multiple transmitters as received at a single receiver location.

Chirp and sub-chirp technology has several advantages over other sound imaging techniques in that spatially coded waveforms with sub-chirp technology provide an enhanced capability to detect critical directional information and characteristics of objects-of-interest that are embedded in remote cavities or channels such as caves or buildings.

SUMMARY OF THE INVENTION

An apparatus, system, and method for locating earth cavities comprising a plurality of transmitters that generate a waveform. Each transmitter divides the waveform into sub-chirp intervals and transmits a known sub-chirp interval from a known location to contact the earth. The resulting sub-chirp interval becomes a leakage signal. The system also includes a means for receiving a plurality of the leakage signals and processing the plurality of leakage signals to approximate the earth cavity size, and location.

DETAILED DESCRIPTION

The present invention uses waveforms traveling through open cavities such as caves or doors to "map" the interior. The waveform may alternatively penetrate minimal coverings such as glass or tarps. The present invention further uses a plurality of transmitters on mobile platforms to transmit waveform signals with different sub-chirp intervals. At least a plurality of the sub-chirp intervals are received by a receiver or receiver means. The means for receiving the sub-chirp intervals may be any means known in the art such as digital receivers. The receiver is designed to receive the sub-chirp signals and process the sub-chirp signals over the entire chirp interval that is covered by all the transmitted sub-chirps. Alternatively the receiving means may processes a plurality of the sub-chirp signals over a plurality of the chirp interval that is covered by a plurality of the transmitted sub-chirps.

The present invention may function over a wide variety of geometries and shows potential for many defense and security system functions. For example, one potential approach is to investigate and develop techniques that allow a passive ground vehicle to converge on obscured or embedded regions with cavities. The analysis and development of this type of system may be based on exploitation of the spatio-temporal multipath information within each received sub-chirp to obtain directional information on embedded cavities within a region of interest. The information may be processed based upon both where the receiver and transmitter are relative to each other and the shape of the signal received. This may allow the ground vehicle to intelligently find and locate obscured regions with targets via exploitation of the directional multipath information in the receive signal. In one embodiment, the present invention may provide a new capability to robotically find embedded and obscured regions with passive satellites, ground vehicles and/or low-flying mini-unmanned aviation vehicle platforms. The present invention further shows potential for implementation for intelligent multifunction geolocation, terrain classification, Information Friend or Foe (IFF) systems, and radar applications over a variety of different system geometries.

The present invention is based on the development of improved sensing and analytic tools that detect and exploit leakage signals that, for example, propagate between two buildings or leak through penetrable surfaces such as walls or layers of the ground. The leak may be an opening in a structure such as a cave mouth or a building window or door.

Figure 1:
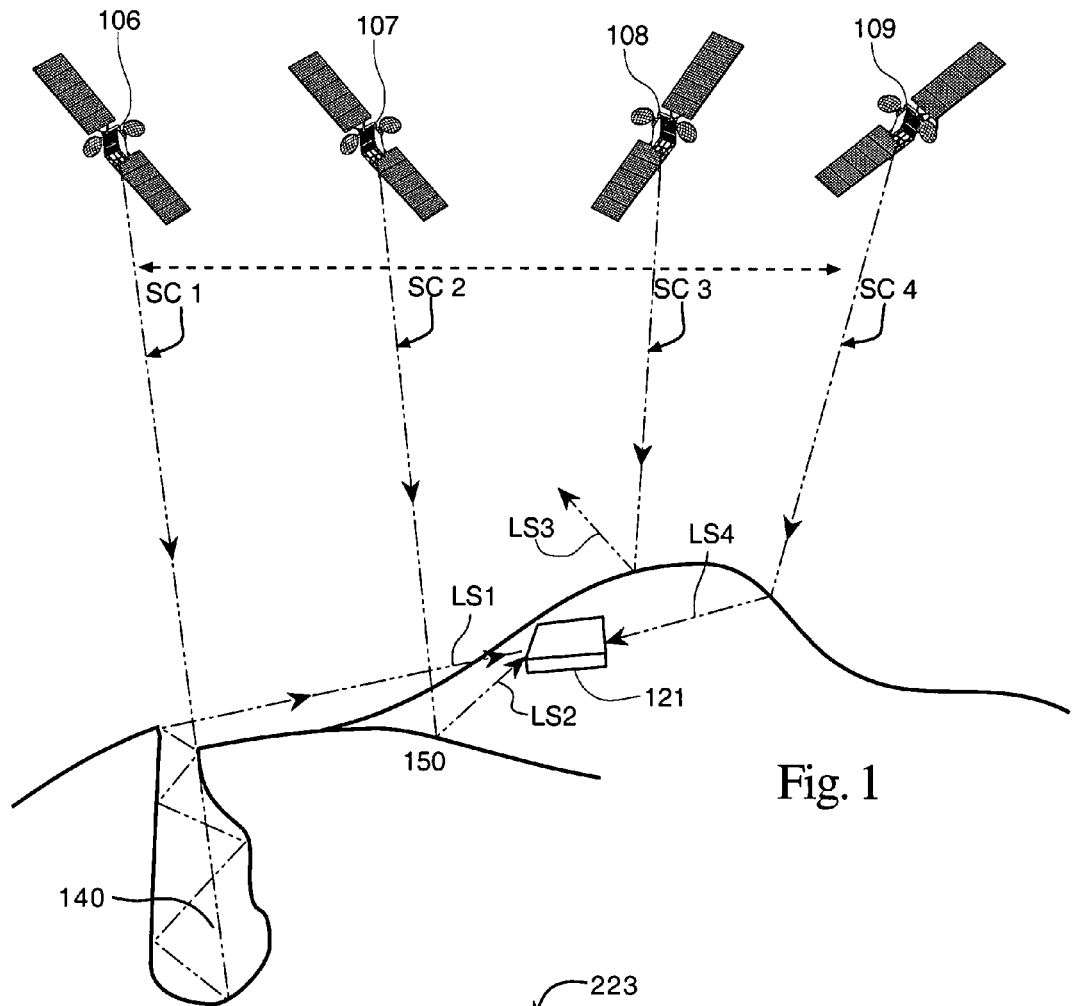
FIG. 1 illustrates an embodiment of the preset invention wherein satellites are used as platforms for sub-chirp transmission and a receiver is ground based.

FIG. 1 shows satellites 106, 107, 108, 109. The satellites 106, 107, 108, 109 are projecting a sub-chirp signal SC1, SC2, SC3, and SC4 respectively. The signals SC1, SC2, SC3, and SC4 contact earth 150 and generate respective leak signals (LS1, LS2, LS3, LS4). As shown in FIG. 1, leak signals LS1, LS2, and LS4 are detected by a receiver 121. Leak signal LS1 contacts the receiver 121 after bouncing in a cave 140.

In FIG. 1, the sub-chirp signals SC1, SC2, SC3, and SC4 may be a plurality of radio frequency (RF) or microwave sub-chirp signals. There may be any number of sub-chirps SCn for a given signal frequency waveform. Preferably one-half of the signal cycle is divided into a selected number of sub-chirps and transmitted toward an object of interest. In FIG. 1, that object is the earth 150 and/or the cave 140. The system may be searching for the cave 140 or simply establishing that the cave 140 may be in that area of the earth. In one embodiment, there are at least three different sub-chirp sources and/or three sub-chirp intervals generating relational data. Different sources may be different locations such as on different satellites or aircraft. Different intervals may be either different periods of time and/or different portions of a frequency. The sub-chirps may also preferably be different frequencies. The sub-chirp frequencies may differ by at least 25 Hz or at least 50 Hz.

A plurality of the sub-chirps 1-n is detected by a receiving means such as a digital receiver or any other receiver known in the art. The receiving means receives a plurality of the leak signals over large bandwidths of from about 300 MHz to about 12 GHz. The frequency waveform may be between Ultra High Frequency (UHF) to about X band. Quantitatively, the frequency waveform may be from about 300 MHz to about 12 GHz. Each sub-chirp interval may be from about 500 MHz to about 2,000 MHz. Alternatively, the sub-chirp is preferably from about 50 MHz to about 500 MHz.

The receiver may be part of a passive sensor system. Passive sensors do not transmit and can operate in covert applications without detection. Alternatively, the receiver may be part of a monostatic radar system. Monostatic radars have a co-located receiver and transmitter. The receiving means measures and processes leakage signals such as LS1 in FIG. 1 and then relocates to establish line-of-sight between the transmitter and a feature that is propagating the leak signal(s). This allows a receiver to process signals in real-time while gathering intelligence information and locating objects-of-interest that may be embedded within an obscuration channel. The receiving means or receiver measures and processes leakage signals, those signals that enter a cavity, explore the cavity and then leave the cavity. Some leakage signals may simply reflect off a solid structure. This type of leakage signal also provides information on where cavities are not located. Preferably the receiver is capable of moving to establish and/or maintain line of sight between the receiver and any leakage signal of interest. This allows the receiver to process signals in real-time while gathering information and locating cavities or objects-of-interest by processing the leakage signals.

A chirp is a signal in which the frequency increases or decreases with time. An increasing frequency is an up-chirp and a decreasing frequency is a down-chirp. Chirp is commonly used in sonar and radar, but has other applications, such as in spread spectrum communications.

A sub-chirp may be a portion of a frequency and preferably a portion of a frequency that changes over time (a chirp). The sub-chip may be created using any means known in the art. One example of sub-chip formation is provided in U.S. Pat. No. 5,898,399, herein incorporated by reference.

An integral part of the present smart sensor concept is to interface the onboard transmitter and/or receiver system with the onboard autonomous control system so that the mini-unmanned aviation vehicles helicopter platform has the capability to positionally-adapt to characteristics of a leakage signal that is measured by the onboard transmitter and/or receiver.

Figure 2:
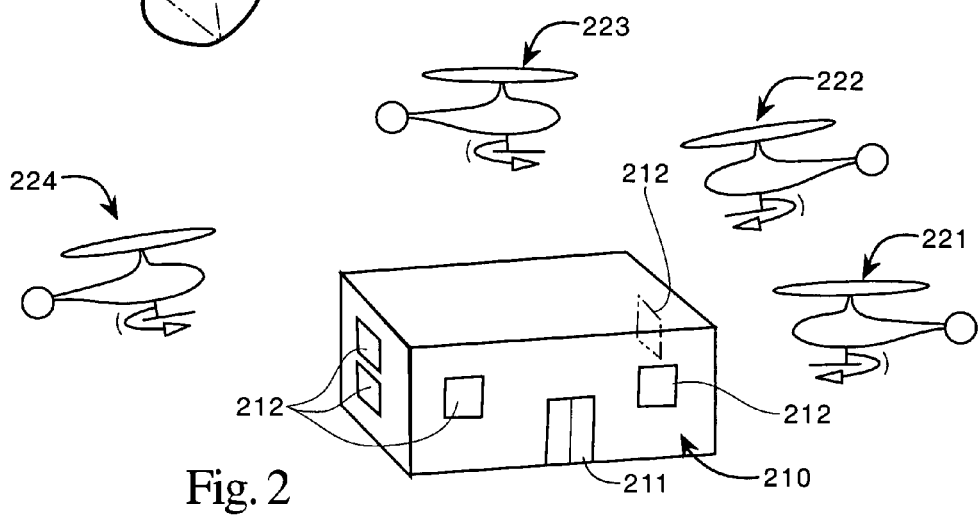
FIG. 2 illustrates an embodiment of the preset invention wherein a receiver and three transmitters are in position using mini-unmanned aviation vehicles to map at least a portion of a building interior.

FIG. 2 illustrates an alternate embodiment of the present invention. In FIG. 2, four mini-unmanned aviation vehicles (mini-UAVs) 221, 222, 223, 224, surround a building-type structure 210 to position-adaptively isolate leakage point 211 and leakage point 212. The leakage point 211 corresponds to a door in the building 210. Leakage point 212 corresponds to various windows in the building 210.

The mini-unmanned aviation vehicles 221, 222, 223, 224 converge on separate leakage points 211 and 212(s) based upon real-time analysis of on-board radar data analysis. Once this set of mini-unmanned aviation vehicles have converged to a location near and in the line of sight of a set of leakage points, the leakage signals are transmitted by three mini-unmanned aviation vehicles 224, 222, 221 at three different frequencies. Each frequency was specific to a specific tone to simulate a sub-chirp special case. Each received by the forth mini-unmanned aviation vehicle 223.

The receiver mini-unmanned aviation vehicle 223 processes signals over the entire bandwidth of the transmit tones from the three transmitting mini-unmanned aviation vehicles 224, 222, 221. The receiver is designed to be passive such that it may be harder to detect in a hostile environment where the source of transmitted signals may be traced back and neutralized. The processing includes analyzing and characterizing objects-of-interest that may be embedded within the building 210 and can potentially map the internal structure of the building 210 or other structures with at least one opening.

Preferably, the transmitting mini-unmanned aviation vehicles 224, 222, 221 change positions relative to the receiving mini-unmanned aviation vehicle 223 over time such that the receiving mini-unmanned aviation vehicle 223 receives signals from multiple locations for improved mapping resolution. More preferably, the mini-unmanned aviation vehicles may change roles from transmitting to receiving as needed to further increase the number of available data points for analysis. The more transmitting and receiving mini-unmanned aviation vehicles used, the more precise the mapping may be.

The receiving means measures and processes leakage signals similarly to that described in FIG. 1. The receiver is designed to change position to establish a line-of-sight relationship between a plurality of the leakage signals. This allows a mini-unmanned aviation vehicle platform to process signals in real-time while gathering intelligence information and locating objects-of-interest that may be located within the building.

Figure 3:
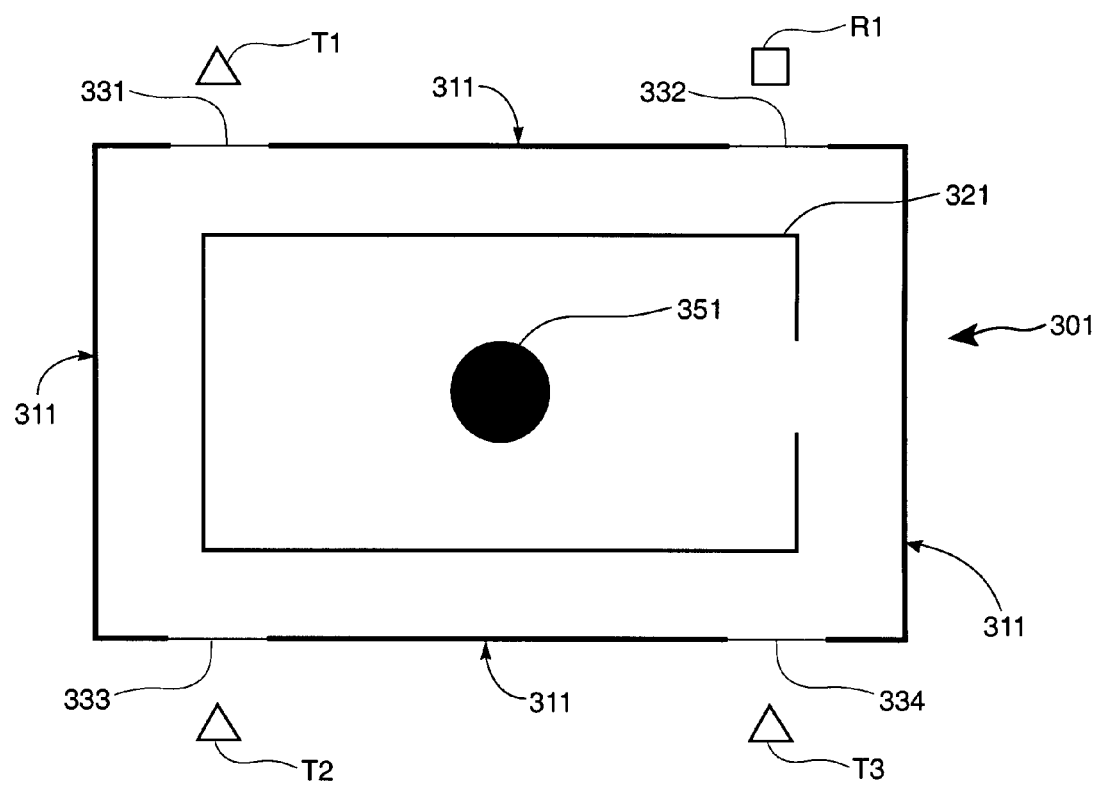
FIG. 3 is a simulation and test geometry of the FIG. 2 concept.

FIG. 3 includes an example of simulation results that pertain to isolating and analyzing leakage signals for environments such as the geometry depicted in FIG. 2. FIG. 3 is a planar representation of a three-dimensional modeling structure and is not to scale. FIG. 3 includes a simulation geometry 301. The simulation geometry components include a concrete outer structure 311, a wooden inner structure 321, four glass tiles 331, 332, 333, 334 and a vertical cylinder 351.

The concrete outer structure 311 is preferably about 10 meters (m) tall (out of the paper with respect to the figure), by 15 m wide and 20 m long. The concrete outer structure 311 is preferably about 10 centimeters (cm) thick. The concrete outer structure 311 preferably has a relative permittivity of from about 4.0 to about 7. Preferably the relative permittivity is about 6.95. The concrete outer structure 311 preferably has a loss tangent of from about 0.5 to about 1.0. Preferably the loss tangent is about 0.74.

The wooden inner structure 321 is preferably about 5 m tall, 5 m wide and 10 m long. The wooden inner structure 321 preferably has a relative permittivity of from about 4.0 to about 8. Preferably the relative permittivity is about 6.95. The wooden inner structure 321 loss tangent is preferably from about 0.5 to about 2.0. Preferably the wooden inner structure 321 loss tangent is about 0.74.

The four glass tiles 331, 332, 333, 334 are each preferably about 2 m wide, 10 m tall and 1 cm thick. The four glass tiles 331, 332, 333, 334 preferably each have a relative permittivity of from about 4.0 to about 10. Preferably the relative permittivity is about 4.44. The four glass tiles 331, 332, 333, 334 loss tangent is preferably from about 0.003 to about 0.01. Preferably the four glass tiles 331, 332, 333, 334 loss tangent is about 0.006. The glass tiles correspond to leakage points for the simulation geometry.

The vertical cylinder 351 in FIG. 3 is preferably metal. The vertical cylinder 351 is preferably about 3 m tall and about 2 m in diameter.

As shown in FIG. 3, waveform transmitters T1, T2 and T3 and a waveform receiver R1 may be located relative to the simulation geometry 301 leakage points. The transmitters T1, T2 and T3 are preferably located about 5 meters to about 15 meters from three of the four glass tiles 331, 333, 334 respectively. The receiver R1 is preferably located about 5 meters to about 15 meters from the glass tile 332. The waveform transmitters T1, T2 and T3 and the waveform receiver R1 simulate the data gathered and analyzed by a mini-unmanned aviation vehicle.

In the present simulation the waveform transmitters T1, T2 and T3 transmit three snapshots over a 10 MHz bandwidth. The receiver R1 collects three "snapshots" of data. The receiver collects each of these snapshots within about a 2 GHz bandwidth. The transmission scheme is a round-the-table scheme where three snapshots of waveform information are gathered.

During snapshot 1, transmitter T1 transmits a 500 MHz narrowband waveform, transmitter T2 transmits a 1 GHz narrowband waveform, and transmitter T3 transmits a 2 GHz narrowband waveform. During snapshot 2, transmitter T1 transmits a 2 GHz narrowband waveform, transmitter T2 transmits a 500 MHz narrowband waveform, and transmitter T3 transmits a 1 GHz narrowband waveform. During snapshot 3, transmitter T1 transmits a 1 GHz narrowband waveform, transmitter T2 transmits a 2 GHz narrowband waveform, and transmitter T3 transmits a 500 MHz narrowband waveform. Adopting this type of agile transmission scheme allows the receiver to intelligently process the data and use "directional multipath" characteristics to learn about the structure of the given environment.

Figure 4A:
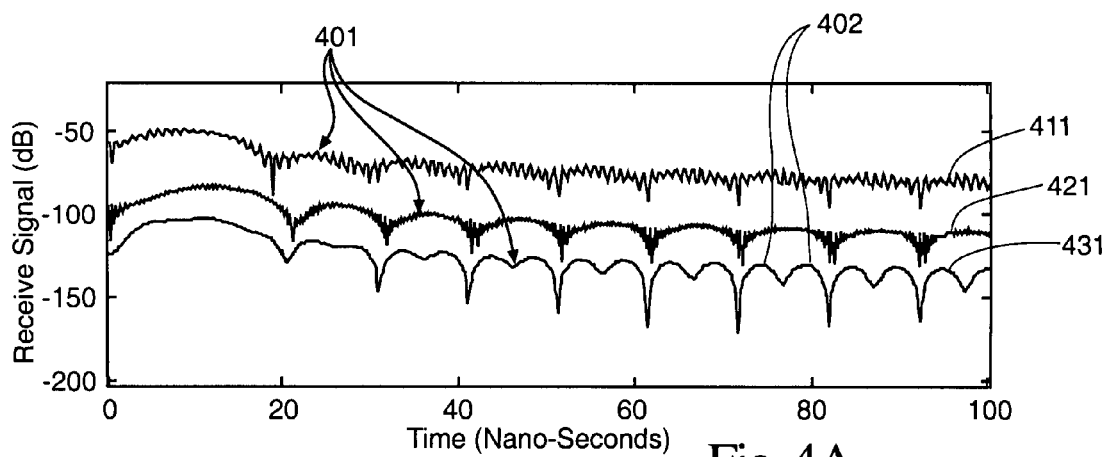
FIGS. 4a-4c are examples of potential simulation results.
Figure 4B:
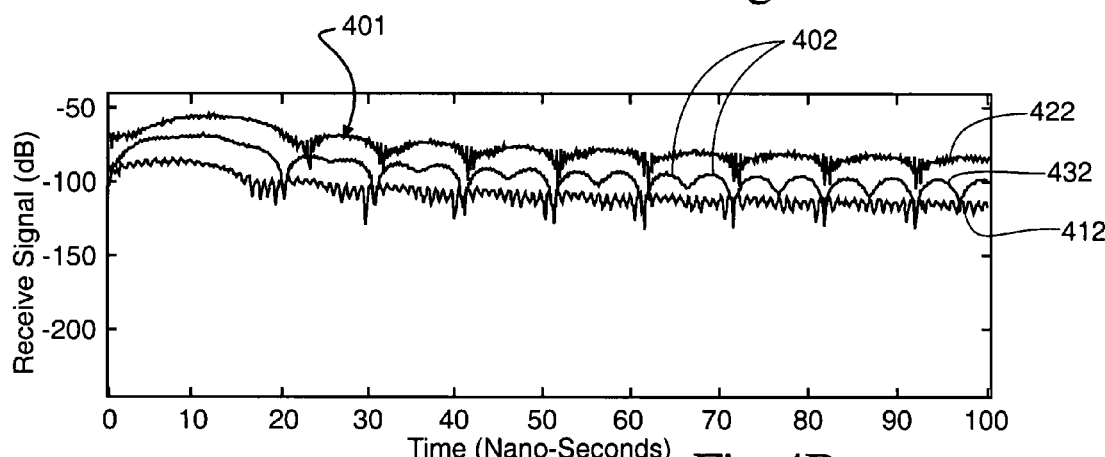
Figure 4C:
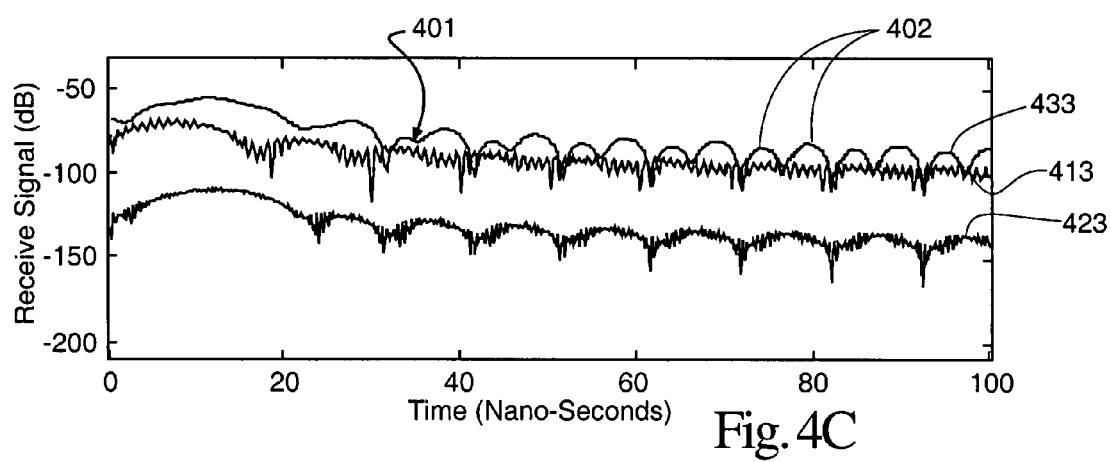

FIGS. 4a, 4b, and 4c illustrate sample possible electromagnetic simulation outputs for the above receiver snapshots. These curves are plotted on a dB scale in order to reduce the dynamic range and observe each snapshot on the same subplot. These graphs are designed to demonstrate the concept of the present invention that images can be interpreted and created using waveforms and sub-chirp data from multiple sources.

The first snapshot is shown in FIG. 4a. Curve 411 is created by transmitter T1 running at about 500 MHz. Curve 421 is created by transmitter T2 running at about 1 GHz. Curve 431 is created by transmitter T3 running at about 2 GHz. The second snapshot is shown in FIG. 4b. Curve 422 is created by transmitter T2 running at about 500 MHz. Curve 432 is created by transmitter T3 running at about 1 GHz. Curve 412 is created by transmitter T1 running at about 2 GHz. The third snapshot is shown in FIG. 4c. Curve 433 is created by transmitter T3 running at about 500 MHz. Curve 413 is created by transmitter T1 running at about 1 GHz. Curve 423 is created by transmitter T2 running at about 2 GHz. The simulation results provided in FIGS. 4a, 4b, and 4c may be generated using, for example, R. J. Marhefka, "National Electromagnetic Code—Basic Scattering Code (NEC-BSC)", Ohio State ElectroScience Lab and Matlab.

These graphs indicate characteristics of the embedded metal cylinder of FIG. 3. For example, all of the curves in FIGS. 4a, 4b, and 4c have descending bumps 401 that are spaced about 10 nanoseconds apart. That data corresponds to a propagation distance of about 3 m. In comparison to the circumference of the 2 m diameter cylinder, the waves may "scrape" or pass across about half the cylinder before generating another descending bump and scattering/propagating in the direction of the receiver. The shape and time span from bump 410 to bump 401 may correlate to the cylinder diameter. When transmitter T3 is located opposite the receiver as shown in FIGS. 4a, 4b, and 4c, there are two elongated small bumps 402 that occur between the large descending bumps. This type of scattering characteristic shows potential for providing information on the relative orientations between the receiver, transmitter, and embedded object with further data processing.

It may also be possible to estimate other characteristics of the embedded object by enhancing this approach with further processing. In fact, it may be possible to develop techniques that partially image the embedded object by jointly exploiting the frequency and spatial diversities that are inherent to this approach of distributed sensing by combining or integrating data in frequency and angle.

Also, from observation of this set of simulation outputs, it may be possible to devise new "multipath-based triangulation" techniques to improve the imaging, and/or geographic or location accuracy of the embedded object in a building or other structure. The processing may also approximate the internal layout of a cave, building, or other structure.

While specific embodiments have been described in detail in the foregoing description and illustrated in the drawings, those with ordinary skill in the art may appreciate that various modifications to the details provided could be developed in light of the overall teachings of the disclosure. The particular arrangements disclosed are intended to be illustrative and not limiting as to the scope of the invention, which is to be given the full breadth of the claims herein.

What is claimed is:

1. A system for locating earth cavities comprising:
   a plurality of satellites based transmitters that generate a waveform;
      each transmitter dividing the wave form into sub-chirp intervals;
      each transmitter transmitting a known sub-chirp interval from a known location to contact the earth,
   the resulting sub-chirp interval becoming a leakage signal; and
   at least one receiver,
      the receiver processing the plurality of leakage signals to approximate the earth cavity size, and location.

2. The system of claim 1 wherein the frequency waveform is from about 300 MHz to about 12 GHz.

3. The system of claim 1 wherein the receiver is located on a land vehicle or aircraft.

4. The system of claim 1 wherein the sub-chirp interval is from about 500 MHz to about 2,000 MHz and there are at least 3 sub-chirp intervals.

5. The system of claim 1 further including a means for extrapolating the plurality of the leakage signals to image the earth cavities.

6. A method for locating an object in a building with leakage points:
   generating a waveform;
   dividing the waveform into sub-chirp intervals;
   transmitting the sub-chirp intervals from multiple known locations to contact the building and the leakage points, the resulting sub-chirp interval becoming a leakage signal;
   receiving a plurality of leakage signals; and
   processing the plurality of leakage signals to approximate the object size, and location.

7. The method of claim 6 wherein the processing further approximates the object composition.

8. The method of claim 6 wherein the transmitting is performed by a plurality of mini-unmanned aviation vehicles.

9. The method of claim 6 wherein the object includes an interior layout and the processing further approximates the internal layout.

10. An apparatus for approximating a building internal room structure and room contents, the apparatus comprising:
    a plurality of transmitters that generate a waveform;
       each transmitter dividing the wave form into sub-chirp intervals;
       each transmitter transmitting a known sub-chirp interval from a known location to contact the building;
       the resulting sub-chirp interval becoming a leakage signal;
    a receiver for receiving a plurality of the leakage signals; and
    a processor for extrapolating the plurality of the leakage signals to approximate the building internal room structure and room contents.

11. The apparatus of claim 10 wherein the plurality of transmitters and the receiver are mounted on a mini-unmanned aviation vehicle.

12. The apparatus of claim 11 wherein the mini-unmanned aviation vehicle is capable of both transmitting a sub-chirp interval and receiving a leakage signal.

* * * * *